(12) United States Patent
Christison

(10) Patent No.: US 8,355,434 B2
(45) Date of Patent: Jan. 15, 2013

(54) DIGITAL VIDEO LINE-BY-LINE DYNAMIC RATE ADAPTATION

(75) Inventor: Gregory L. Christison, McKinney, TX (US)

(73) Assignee: QUALCOMM Incorporated, San Diego, CA (US)

( * ) Notice: Subject to any disclaimer, the term of this patent is extended or adjusted under 35 U.S.C. 154(b) by 2139 days.

(21) Appl. No.: 11/328,204

(22) Filed: Jan. 9, 2006

(65) Prior Publication Data

US 2006/0153291 A1    Jul. 13, 2006

Related U.S. Application Data

(60) Provisional application No. 60/642,737, filed on Jan. 10, 2005.

(51) Int. Cl.
*H04N 7/12* (2006.01)
(52) U.S. Cl. ......... 375/240.03; 375/240.01; 375/240.02; 375/240.08; 375/240.19; 375/240.26; 382/232; 382/236; 382/239; 382/240
(58) Field of Classification Search .......... 375/240.01–240.03, 240.07, 240.16, 375/240.21, 240.26; 382/232, 236, 239, 382/240; 370/352
See application file for complete search history.

(56) References Cited

U.S. PATENT DOCUMENTS

| | | | |
|---|---|---|---|
| 4,764,805 A * | 8/1988 | Rabbani et al. .......... 375/240.01 |
| 5,727,092 A * | 3/1998 | Sandford et al. ............. 382/251 |
| 6,256,350 B1 * | 7/2001 | Bishay et al. ............ 375/240.21 |
| 7,016,337 B1 * | 3/2006 | Wu et al. ........................ 370/352 |
| 7,023,915 B2 * | 4/2006 | Pian et al. ................. 375/240.02 |
| 7,106,909 B2 * | 9/2006 | Satoh et al. ..................... 382/239 |
| 7,170,938 B1 * | 1/2007 | Cote et al. ................ 375/240.03 |
| 7,302,102 B2 * | 11/2007 | Reynolds et al. ............. 382/232 |
| 7,714,747 B2 * | 5/2010 | Fallon ............................. 341/51 |
| 7,860,345 B2 * | 12/2010 | Satoh et al. ..................... 382/291 |
| 7,876,821 B2 * | 1/2011 | Li et al. ..................... 375/240.12 |
| 8,165,203 B2 * | 4/2012 | Fernandes ................. 375/240.03 |
| 8,208,554 B2 * | 6/2012 | Fernandes ................. 375/240.19 |
| 2002/0090027 A1 * | 7/2002 | Karczewicz et al. ..... 375/240.01 |
| 2003/0174769 A1 * | 9/2003 | Nagumo et al. .......... 375/240.02 |
| 2004/0197024 A1 * | 10/2004 | Bobichon et al. ............. 382/239 |
| 2006/0067408 A1 * | 3/2006 | Roman et al. ............. 375/240.23 |
| 2006/0109339 A1 * | 5/2006 | Chao et al. .................. 348/14.01 |
| 2007/0053428 A1 * | 3/2007 | Saleem et al. ................. 375/240 |
| 2008/0123739 A1 * | 5/2008 | Reznic et al. ............ 375/240.08 |

* cited by examiner

*Primary Examiner* — David Ometz
*Assistant Examiner* — Eboni Hughes
(74) *Attorney, Agent, or Firm* — Nicholas J. Pauley; Sam Talpalatsky; Jonathan T. Velasco

(57) ABSTRACT

The present invention provides a method and apparatus for compressing video data for wireless transmission. The invention continually monitors the output of a video data encoder and maintains a running average for the data output rate over multiple lines of video data. The encoder compresses video data on a line-by-line basis. The invention also monitors the occupancy of the data buffer and as well as the performance of the wireless subsystem to determine real time available channel capacity. If the average data rate exceeds the available channel capacity, the invention increases data compression on subsequent lines of video data until the average data rate falls within the channel capacity. If the average data output rate is less than the channel capacity, the invention reduces data compression on subsequent lines of video data until the average data rate increases to match the channel capacity.

20 Claims, 6 Drawing Sheets

DIGITAL VIDEO LINE-BY-LINE DYNAMIC RATE ADAPTATION

CROSS-REFERENCE TO RELATED APPLICATIONS

This application claims the benefit of and priority to U.S. Provisional Patent Application No. 60/642,737 filed Jan. 10, 2005 the technical disclosures of which are hereby incorporated herein by reference.

TECHNICAL FIELD

The present invention relates generally to wireless communications systems, and more specifically to data compression methods of wireless video data.

BACKGROUND OF THE INVENTION

As the bandwidth of wireless systems expands, the ability to transmit digital video over wireless links has become easier and more cost effective. However, the data capacity of such wireless systems may vary over time depending on the surrounding conditions. This creates a significant challenge for developing a low-cost design that provides sufficient quality of service for consumer video applications.

Typical video compression techniques require buffering of multiple frames of data for the compression and decompression steps. Unfortunately, this buffering requires significant memory, which can add considerable cost to the system.

Furthermore, video compression techniques themselves tend to be variable rate, as the entropy of the source data tends to change on a line-by-line or frame-by-frame basis. This variable entropy also necessitates a dynamic adaptation algorithm.

Current video transmission systems use standard compression techniques such as MPEG2 (Motion Pictures Expert Group) and JPEG2000 (Joint Photographic Experts Group). MPEG2 uses compression techniques that take advantage of similarity between pixels as well as similarities between multiple frames of data. Because of this approach, any change in the compression algorithm would need to be made after several frames have been transmitted. This delay requires significant amounts of data to be buffered in the transmission system.

JPEG2000 uses compression techniques that are executed over an entire frame of data. This too requires at one complete frame of data to be transmitted before changing the compression algorithm.

Existing compression systems also use a fixed quantization and compression mechanism to enable either a constant bit rate data stream or a "variable" bit rate data stream. The definition of "variable" in this case is dictated by the algorithm, and there is no feedback mechanism from the channel to change the bit rate based upon channel conditions.

To enable low cost wireless transport of digital video, it would be desirable to have a method to dynamically adapt the data rate required for the video while buffering a small percentage of a single frame of video. This dynamic adjustment of the data rate should take place without any interruption of service to the viewer.

SUMMARY OF THE INVENTION

The present invention provides a method and apparatus for compressing video data for wireless transmission. The invention continually monitors the output of a video data encoder and maintains a running average for the data output rate over multiple lines of video data. The encoder compresses video data on a line-by-line basis. The invention also monitors the occupancy of the data buffer and as well as the performance of the wireless subsystem to determine real time available channel capacity. If the average data rate exceeds the available channel capacity, the invention increases data compression on subsequent lines of video data until the average data rate falls within the channel capacity. If the average data output rate is less than the channel capacity, the invention reduces data compression on subsequent lines of video data until the average data rate increases to match the channel capacity.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE DRAWINGS

Figure 1:
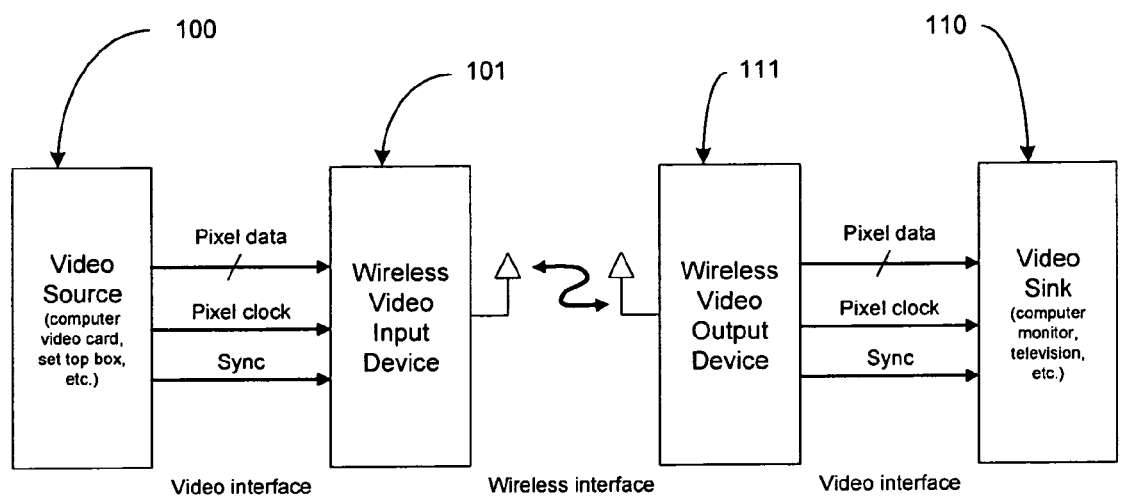
FIG. 1 is a block diagram of a typical wireless video system in which the present invention may be implemented.

FIG. 1 is a block diagram of a typical wireless video system in which the present invention may be implemented. A video data stream is transferred wirelessly from a video source 100 to a video sink 110 (e.g., computer monitor, television, etc.). The wireless video input device 101 and output device 111 provide the wireless connectivity. The problem is how to maintain data throughput across the wireless interface, so that the video sink 110 sees no disruption of video data.

Figure 2:
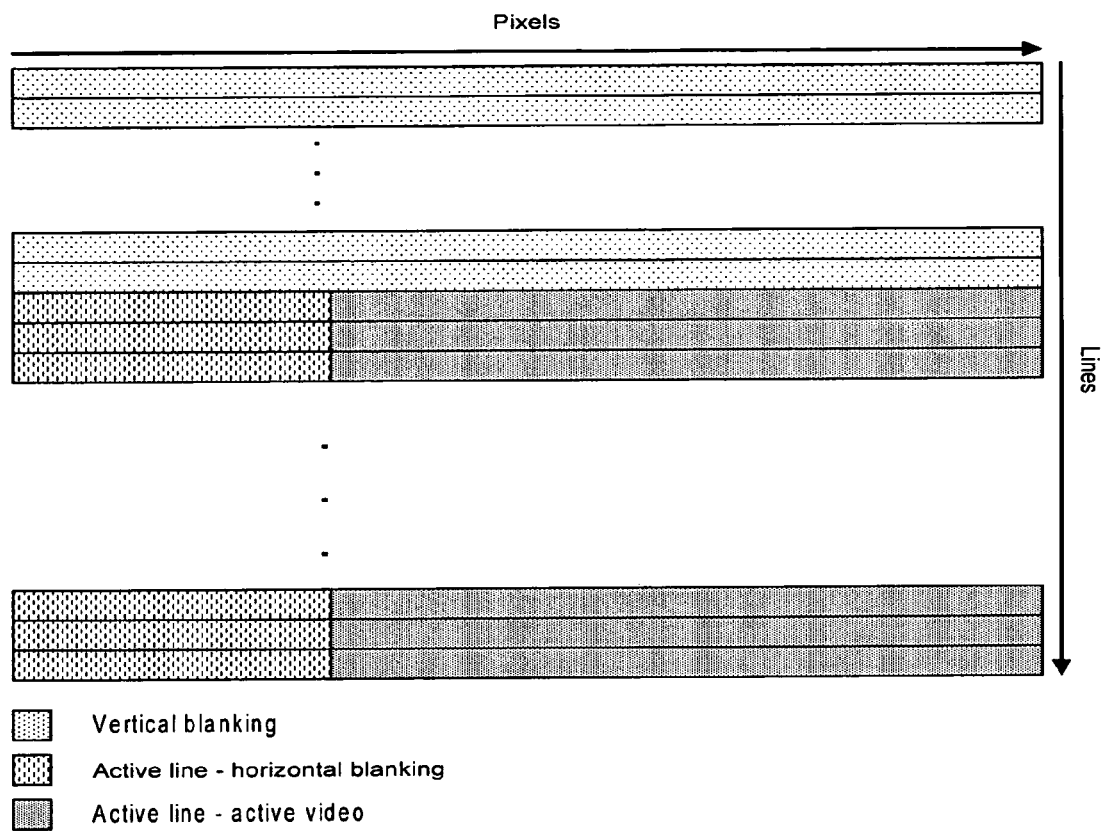
FIG. 2 shows the format of a video frame in accordance with an embodiment of the present invention.

FIG. 2 shows the format of a video frame in accordance with an embodiment of the present invention. Each video frame is composed of active and blanking lines. Each active line is composed of active and blanking pixels. Only the data during the active video section of the video frame is displayed and this data consists of three color components in Red, Green, and Blue (RGB) or YUV 4:2:2 format. (In the YUV color model, Y represents the luminance signal, and U and V represent the color-difference signals.)

The present invention provides a method for compressing video for transmission over a wireless link. An encoder is responsible for taking uncompressed video data and encoding it into compressed packets for transmission over the link. A decoder is responsible for extracting the information from the received packets, uncompressing it, and presenting it as uncompressed video.

Figure 3:
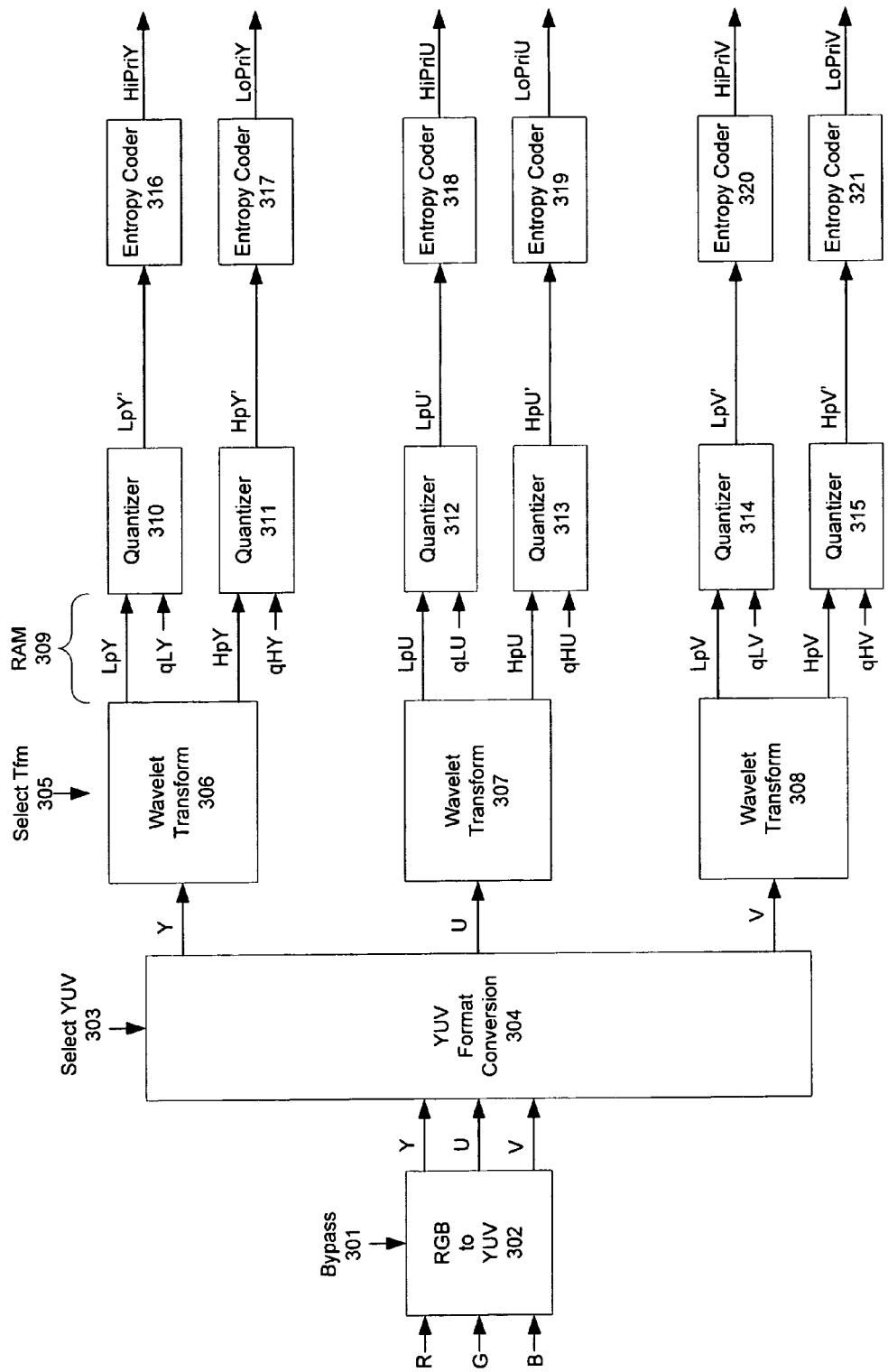
FIG. 3 shows a block diagram outlining the data flow for RGB components of each line of a video frame in accordance with an embodiment of the present invention.

The encoder uses several techniques for compressing the video data. These included:

Color space conversion (RGB to YCbCr) with sub-sampling of CbCr
Wavelet transform to enable efficient entropy encoding
Quantization to vary the level of compression
Entropy encoding FIG. 3 shows a block diagram outlining the data flow for RGB components of each line of a video frame in accordance with an embodiment of the present invention. The RGB-to-YUV block 302 uses a color-space transform to map the Red, Green, and Blue components for each pixel into corresponding YUV components in 4:4:4 format. If the Bypass control 301 is asserted, the RGB-to-YUV block 302 is bypassed.

The Select YUV control 303 determines whether the YUV Format Conversion block 304 is bypassed or whether lowpass filters and downsamplers will convert YUV 4:4:4 format to YUV 4:2:2 or YUV 4:1:1 format.

The YUV components produced by the YUV Format Conversion Block 304 are passed through separate wavelet transforms 306(Y), 307(U) and 308(V). The SelectTfm control 305 determines whether two-level integer versions of the Daubechies (7,9) or the LeGall (5,3) wavelet transforms are used to generate lowpass and highpass subbands for each color-component. Because two-level wavelet transforms are used, for a given line, the number of lowpass (high priority) wavelet coefficients constitutes 25% of the pixels in the line, and highpass (low priority) wavelet coefficients constitute 75% of the pixels in the line.

For the Y-component, the lowpass subband is labeled LpY, and the highpass subband is labeled HpY. Similarly, the corresponding subbands for the U and V components are labeled LpU, HpU, LpV, HpV respectively. The LpY, HpY, LpU, HpU, LpV, HpV subbands for a given line are stored in a RAM 309 because video rate control requires access to all subbands for a given line to determine optimal quantization settings for those subbands.

Once the wavelet transforms are completed, video rate control determines the optimal quantization levels qLY, qHY, qLU, qHU, qLV, qHV for the respective subbands LpY, HpY, LpU, HpU, LpV, HpV. The respective pairs of subband coefficients and quantization levels (e.g., LpY/qLY, HpY/qHY, etc.) are fed into quantizers 310-315, which calculate the quantized coefficient $x_q$ by the following process:

$x_q = x >> q$,
If (x<0) AND (q LSBs of x are NOT all 0s) AND (q<>0)
$x_q = x_q + 1$ The above pseudocode shows that the quantizer eliminates the q least significant bits of x by rightshifting, to get $x_q$. To obtain shorter entropy codes, negative values of $x_q$ are incremented so that negative numbers are rounded towards zero.

After quantization, the data is fed into entropy encoders 316-321, and the invention labels the entropy-coded LpY', LpU', LpV', HpY', HpU', and HpV' data as HiPriY, HiPriU, HiPriV, LoPriY, LoPriU, LoPriV, respectively.

The present invention can be implemented using either lossless or lossy compression. The example system described above produces lossy compression. To achieve lossless compression, the quantizers 310-315 would be absent, and the data would move directly from the wavelet transforms 306-308 to the entropy encoders 316-321.

Compression is performed over a single line or a few (e.g., <8) lines of video. The compression ratio is set by allowing different settings for the sub-sampling and quantization. These settings can be changed as needed to ensure the video data rate does not exceed the capacity of the wireless link. The settings can also be changed several times during a single frame of video. A Control Entity is used to adjust the video compression parameters.

Figure 4:
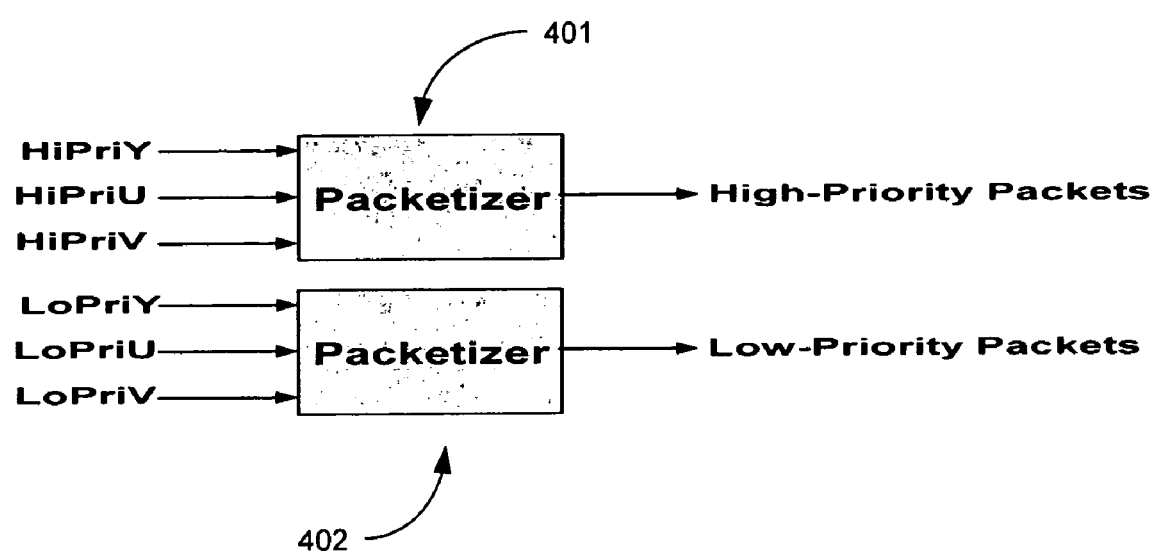
FIG. 4 shows a pair of packetizers in accordance with an embodiment of the present invention.

FIG. 4 shows a pair of packetizers in accordance with an embodiment of the present invention. Separate packetizers 401, 402 accumulate HiPriY, HiPriU, HiPriV into a high-priority packet and LoPriY, LoPriU, LoPriV into a low-priority packet, respectively. The prioritization is done so that packets containing residual data will be offered greater protection than packets containing high-pass sub-bands. Because residual data from one line is used in inter-line prediction of the next line, residual data loss may cause errors to propagate onto a subsequent line. In contrast, since high-pass data for a given line is independent of other lines, high-pass data loss does not affect subsequent lines. It should be noted that the packetizers typically pack data from more than one line into a single packet.

Figure 5:
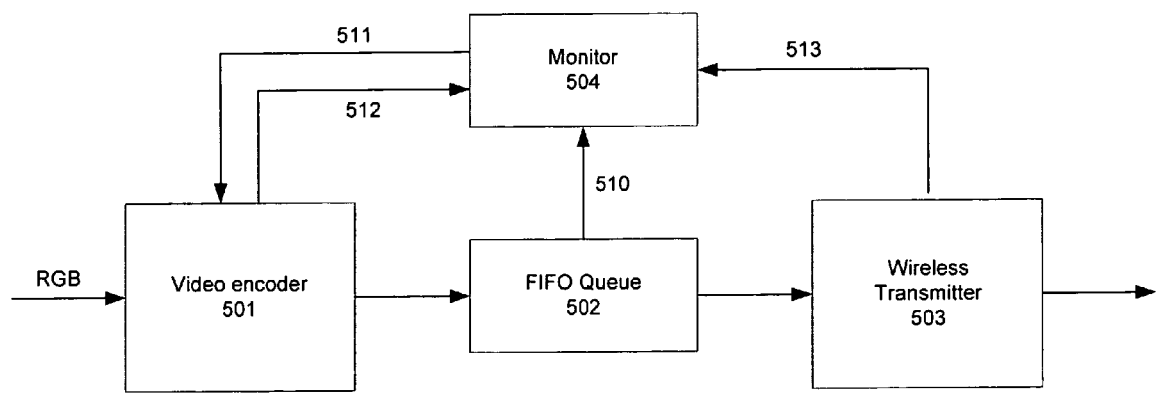
FIG. 5 is a block diagram illustrating the interrelation of system components that allows modification of video compression based on real time link information in accordance with an embodiment of the present invention.

FIG. 5 is a block diagram illustrating the interrelation of system components that allows modification of video compression based on real time link information in accordance with an embodiment of the present invention. In this figure, the video encoder 501 is a simplified representation of the hardware depicted in FIGS. 3 and 4. As packetized video data leaves the encoder 501 it is buffered in a first-in-first-out (FIFO) queue 502. From there, the data packets are passed to the wireless transmitter 503.

By monitoring the activity of the above components, the Control Entity can adjust multiple parameters to set the compression ratio for each line of video. The Control Entity contains a monitor 504 that collects information from three sources to make a decision regarding the compression settings. The information includes:

The compression ratio from the last several lines 512
The buffer capacity in the ultra-wideband (UWB) media access control (MAC) 510
The UWB physical layer (PHY) rate control algorithm 513

Information from these sources is used to set the parameters via input 511 in such a way as to minimize the probability of buffer overrun while maximizing video quality.

The parameters that can be adjusted in the compression algorithm are color space sub-sampling and quantization. The quantization level can be set independently for each color component as well as separately for highpass and lowpass information out of the wavelet transform.

A table is maintained at both the encoder and decoder that contains multiple sets of the adjustable encoder parameters. Each set corresponds to a different compression ratio and video quality. The index to this table is used to adjust the compression ratio and video quality. The index used to encode any given packet is placed in the header of the packet. The decoder then uses this index to enable the correct decoding of the packet. The encoder can simply increment or decrement the index to adjust the compression ratio.

Figure 6:
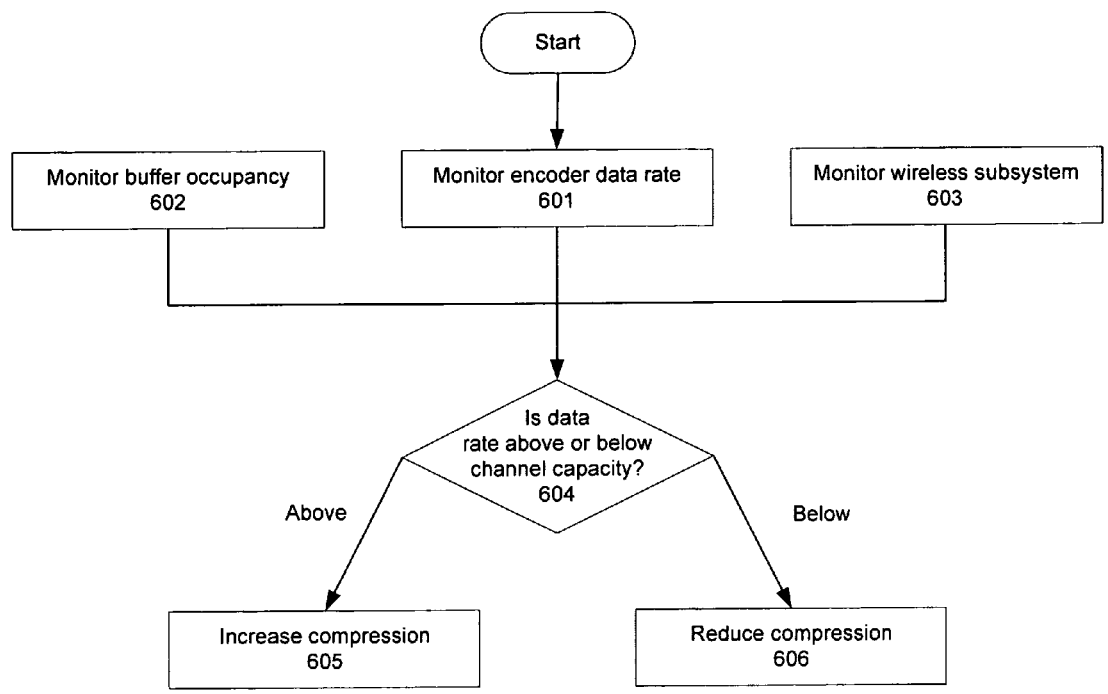
FIG. 6 is a flowchart illustrating the process of adjusting the compression ratio of encoded video data in accordance with an embodiment of the present invention.

FIG. 6 is a flowchart illustrating the process of adjusting the compression ratio of encoded video data in accordance with an embodiment of the present invention. The exact compression level on a given set of lines is not known a priori, nor can it easily be calculated a priori. Therefore, the Control Entity continually monitors the system components in order to adjust the compression level on a real time basis.

The Control Entity continually monitors the rate of data coming out of the encoder and calculates a running average of the encoder output data rate (step 601). The Control Entity also monitors the current buffer occupancy (step 602) and the wireless subsystem (step 603) to determine the current buffer and channel capacity.

As the channel capacity of the wireless link fluctuates due to interference, rather than re-encoding data to meet the exact data rate requirement, the Control Entity maintains the average data rate at the output of the encoder, while simultaneously minimizing the variance. This is achieved by determining if the average data rate is above or below the current channel capacity (step 604). If the average data rate is higher than the channel capacity, subsequent lines are more heavily compressed to bring the average down (step 605). If the encoder output rate is below the channel capacity, the compression level may be reduced to improve the quality of the image (step 606). This process allows the compression ratio to be adjusted on the fly on a line-by-line basis.

The channel capacity may also be replaced with some other data rate target that may be below the true channel capacity to enable a margin and thereby minimize errors.

The present invention can significantly lower the amount of buffering required in the wireless link to transmit high quality video. This is accomplished in two ways. First, since the compression algorithm is run over a small number of lines, the amount of buffering required is limited to these lines. Second, the quality and capacity of a wireless link can change over time. To deal with these changes, prior art systems use additional buffering to accommodate short "outages" on the link. The present invention simply increases the compression ratio when needed to keep an outage from affecting the overall video picture.

The present invention also enables a wireless link to provide video displays at lower quality when the link becomes poor. Rather than having a complete outage of video, the wireless link can change the encoder settings to enable a much lower data rate while still maintaining a visible picture. This can allow the system to provide information to the user to "fix" the wireless link if needed.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

I claim:

1. A method for compressing video data for wireless transmission, the method comprising:
   (a) monitoring output of a video data encoder and calculating a running average for data output rate over multiple lines of a frame of video comprising the multiple lines and one or more additional lines of video data, wherein the encoder compresses video data on a line-by-line basis;
   (b) monitoring a wireless subsystem to determine real time channel capacity;
   (c) comparing said average data output rate to said real time channel capacity; and
   (d) increasing or reducing data compression on at least one of the one or more additional lines of the frame of video on a line by line basis based on the average data output rate of the multiple lines and the real time channel capacity.

2. The method according to claim 1, further comprising monitoring a data buffer to determine real time buffer occupancy, wherein increasing or reducing data compression is further based on the real time buffer occupancy.

3. The method according to claim 1, wherein encoder compression parameters are sent to a decoder using a single index value that corresponds to a pre-defined table of parameters.

4. The method according to claim 3, wherein the index can change on a line-by-line basis.

5. The method according to claim 1, wherein data compression is lossless.

6. The method according to claim 1, wherein data compression is lossy.

7. An apparatus for compressing video data for wireless transmission, comprising:
   (a) a first monitor configured to monitor output of a video data encoder and calculate a running average for data output rate over multiple lines of a frame of video comprising the multiple lines and one or more additional lines of video data, wherein the encoder compresses video data on a line-by-line basis;
   (b) a second monitor configured to monitor a wireless subsystem and determine real time channel capacity;
   (c) a comparator configured to compare said average data output rate to said real time channel capacity; and
   (d) a control entity configured to increase or decrease data compression on at least one of the one or more additional lines of the frame of video on a line by line basis based on the average data output rate of the multiple lines and the real time channel capacity.

8. The apparatus according to claim 7, further comprising:
   (e) a third monitor configured to monitor a data buffer and determine real time buffer occupancy wherein the control entity is further configured to increase or decrease data compression based on the real time buffer occupancy.

9. The apparatus according to claim 7, wherein encoder compression parameters are sent to a decoder using a single index value that corresponds to a pre-defined table of parameters.

10. The apparatus according to claim 9, wherein the index can change on a line-by-line basis.

11. The apparatus according to claim 7, wherein data compression is lossless.

12. The apparatus according to claim 7, wherein data compression is lossy.

13. An apparatus for compressing video data for wireless transmission, comprising:
   means for monitoring the output of a video data encoder and calculating a running average for data output rate over multiple lines of a frame of video comprising the multiple lines and one or more additional lines of video data, wherein the encoder compresses video data on a line-by-line basis;
   means for monitoring a wireless subsystem to determine real time channel capacity;
   means for comparing said average data output rate to said real time channel capacity; and
   means for increasing or decreasing data compression on at least one of the one or more additional lines of the frame of video on a line by line basis based on the average data output rate of the multiple lines and the real time channel capacity.

14. A non-transitory computer-readable medium having computer-executable instructions for execution by an apparatus, the computer-executable instructions for encoding and decoding digital information, comprising:
   instructions for monitoring the output of a video data encoder and calculating a running average for data output rate over multiple lines of a frame of video comprising the multiple lines and one or more additional lines of video data, wherein the encoder compresses video data on a line-by-line basis;

instructions for monitoring a wireless subsystem to determine real time channel capacity;

instructions for comparing said average data output rate to said real time channel capacity; and instructions for increasing or reducing data compression on at least one of the one or more additional lines of the frame of video on a line by line basis based on the average data output rate of the multiple lines and the real time channel capacity.

15. A set top box comprising:

a first monitor configured to monitor the output of a video data encoder and calculate a running average for data output rate over multiple lines of a frame of video comprising the multiple lines and one or more additional lines of video data, wherein the encoder compresses video data on a line-by-line basis;

a second monitor configured to monitor a wireless subsystem comprising at least one antenna and to determine real time channel capacity;

a comparator configured to compare said average data output rate to said real time channel capacity;

a control entity configured to increase or decrease data compression on at least one of the one or more additional lines of the frame of video on a line by line basis based on the average data output rate of the multiple lines and the real time channel capacity, wherein if the average data output rate is less than the real time channel capacity, the control entity reduces data compression on subsequent lines of video until the average data output rate increases to match the real time channel capacity; and a transmitter configured to transmit the output of the video data encoder via the at least one antenna.

16. An apparatus for transmitting compressed video data, the apparatus comprising:

a video encoder configured to compress video data on a line-by-line basis;

a controller configured to determine a running average of a data output rate of the video encoder over multiple lines of a frame of video comprising the multiple lines and one or more additional lines of video data, to determine a real time channel capacity for a wireless channel, and to compare the running average of the data output rate to the real time channel capacity; and a wireless transmitter configured to transmit compressed video data output from the video encoder via the wireless channel, wherein the controller controls the video encoder to increase or decrease data compression on at least one of the one or more additional lines of the frame of video on a line by line basis based on the comparison of the running average of the data output rate of the multiple lines to the real time channel capacity.

17. The apparatus according to claim 16, further comprising a data buffer configured to buffer the compressed video data from the video encoder to the wireless transmitter, wherein the controller is further configured to determine a real time buffer occupancy of the buffer and control the video encoder to increase or decrease data compression on subsequent lines of the frame of video based on the real time buffer occupancy.

18. The apparatus according to claim 16, wherein the video encoder is configured to compress video data according to a single index value that corresponds to a pre-defined table of parameters.

19. The apparatus according to claim 18, wherein the wireless transmitter is configured to transmit to single index value via the wireless channel.

20. The apparatus according to claim 16, wherein the video encoder is configured to compress video data using lossy data compression.

* * * * *